United States Patent
Niranjayan et al.

(10) Patent No.: US 9,554,348 B2
(45) Date of Patent: Jan. 24, 2017

(54) TIMING SYNCHRONIZATION OF WIRELESS NETWORKS

(71) Applicants: Somasundaram Niranjayan, Culver City, CA (US); Andreas F. Molisch, Los Angeles, CA (US)

(72) Inventors: Somasundaram Niranjayan, Culver City, CA (US); Andreas F. Molisch, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 251 days.

(21) Appl. No.: 13/906,117

(22) Filed: May 30, 2013

(65) Prior Publication Data
US 2013/0322426 A1 Dec. 5, 2013

Related U.S. Application Data

(60) Provisional application No. 61/653,282, filed on May 30, 2012.

(51) Int. Cl.
  H04J 3/06 (2006.01)
  H04W 56/00 (2009.01)
  H04B 7/26 (2006.01)
(52) U.S. Cl.
  CPC ........ H04W 56/0055 (2013.01); H04B 7/2662 (2013.01); H04J 3/0667 (2013.01); H04J 3/0673 (2013.01)

(58) Field of Classification Search
  CPC ............. H04W 56/001; H04W 56/0015; H04J 3/0641; H04J 3/065; G04G 7/00; G06F 1/12; H04B 7/2662
  USPC ........ 370/350, 503, 336, 448, 216; 709/248; 375/371
  See application file for complete search history.

(56) References Cited

U.S. PATENT DOCUMENTS

| | | | |
|---|---|---|---|
| 2008/0168182 A1* | 7/2008 | Frank | G06F 1/12 709/248 |
| 2008/0170592 A1* | 7/2008 | Hack | H04J 3/0641 370/503 |
| 2009/0141738 A1* | 6/2009 | Li | H04L 12/413 370/448 |
| 2009/0310571 A1* | 12/2009 | Matischek | H04W 72/0406 370/336 |

(Continued)

OTHER PUBLICATIONS

Choi, B.J. et al. 2012. DCS: Distributed Asynchronous Clock Synchronization in Delay Tolerant Networks. IEEE Transactions on Parallel and Distributed Systems, vol. 23, No. 3, pp. 491-504, Mar. 2012.

(Continued)

*Primary Examiner* — Brian O'Connor
*Assistant Examiner* — Lionel Preval
(74) *Attorney, Agent, or Firm* — McDermott Will & Emery LLP

(57) ABSTRACT

A single wireless slave node may be in a timing virtual network (TVN) with neighboring wireless slave nodes. The single wireless slave node may store information indicative of the identity, link propagation delay, and channel signature of each of its neighboring wireless slave nodes. The single wireless slave node may repeatedly update a timing estimate based on the stored information and by performing a physical layer fast reference signal broadcast transmission and reception.

20 Claims, 9 Drawing Sheets

(56) References Cited

U.S. PATENT DOCUMENTS

| | | | |
|---|---|---|---|
| 2010/0085989 A1* | 4/2010 | Belhadj | H04J 3/0667 370/503 |
| 2012/0069943 A1* | 3/2012 | Lim | H04J 3/0641 375/371 |
| 2013/0063301 A1 | 3/2013 | Pattabiraman et al. | |
| 2014/0226459 A1* | 8/2014 | Edmiston | 370/216 |

OTHER PUBLICATIONS

Chui, C.-C. et al. 2009. Time transfer in impulse radio networks. Communications, IEEE Transactions on, vol. 57, No. 9, pp. 2771-2781, Sep. 2009.

Denis, B. et al. 2006. Joint Distributed Synchronization and Positioning in UWB Ad Hoc Networks Using TOA. IEEE Transactions on Microwave Theory and Techniques, vol. 54, No. 4, pp. 1896-1911, Apr. 2006.

Esterline, J. 2008. Oscillator phase noise: Theory vs practicality, Greenray Industries, Inc. Report, Apr. 2008, 14 pages.

Giridhar, A. et al. 2006 Distributed clock synchronization over wireless networks: Algorithms and analysis. Decision and Control, 2006 45th IEEE Conference on, pp. 4915-4920, Dec. 2006.

Hu, A.-S.C. 2007. Time Synchronization in Large-Scale Networks. Doctoral Dissertation presented to the factulry of the Graduate School of Cornell University. Jan. 2007, 179 pages.

Hu, A.-S.C. et al. 2006. On the scalability of cooperative time synchronization in pulse-connected networks. Information Theory, IEEE Transactions on, vol. 52, No. 6, pp. 2725-2748, Jun. 2006.

Leng, M. et al. 2011. Distributed clock synchronization for wireless sensor networks using belief propagation. Signal Processing, IEEE Transactions on, vol. 59, No. 11, pp. 5404-5414, Nov. 2011.

Lindsey, W. et al. 1985. Network synchronization. Proceedings of the IEEE, vol. 73, No. 10, pp. 1445-1467, Oct. 1985.

Network Time Protocol Project. 2012. Web capture of http://www.ntp.org from May 25,2012 (Downloaded Jan. 6, 2014 from http://web.archive.org/web/20120525002845/http://www.ntp.org).

Ranganathan, P. et al. 2010. Time synchronization in wireless sensor networks: A survey. Int. Journal of UbiComp, vol. 1, No. 2, pp. 92-102, Jul. 2010.

Schenato, L. et al. 2007. A distributed consensus protocol for clock synchronization in wireless sensor network. In Decision and Control, 2007 46th IEEE Conference on, pp. 2289-2294, Dec. 2007.

Shen, Y. et al. 2010. Fundamental Limits of Wideband Localization Part I: A General Framework. Information Theory, IEEE Transactions on, vol. 56, No. 10, pp. 4956-4980, Oct. 2010.

* cited by examiner

TIMING SYNCHRONIZATION OF WIRELESS NETWORKS

CROSS-REFERENCE TO RELATED APPLICATION

This application is based upon and claims priority to U.S. provisional patent application 61/653,282, entitled "[ALGORITHM FOR TIMING SYNCHRONIZATION OF WIRELESS NETWORKS," filed May 30, 2012. The entire content of this application is incorporated herein by reference.

STATEMENT REGARDING FEDERALLY SPONSORED RESEARCH

This invention was made with government support under Grant No. N00014-11-1-0011 awarded by the Office of Naval Research. The government has certain rights in the invention.

BACKGROUND

Technical Field

This disclosure relates to wireless networks and to timing synchronization in such networks.

Description of Related Art

Timing, defined here as a process of aligning time origins/references (offsets) and rates (skews) of two physically separate time keeping devices, is a fundamental task in wireless networks. One of its components, namely frequency (clock rate) synchronization, can be achieved by devices using phase-locked loops to adjust their local oscillator frequency to a master clock (base station, GPS satellite, or another device within an ad-hoc network). However, alignment of time offsets (including propagation delays) can be more involved. It can be achieved by many different techniques, motivated by the fact that different degrees of precision are required for different applications.

Timing a network of wired/wireless nodes is not a new problem. For example, computers connected to the Internet, and cellular phones connected to a base station are examples of networked devices that attempt to keep a common time reference (also W. Lindsey, F. Ghazvinian, W. Hagmann, and K. Dessouky, "Network synchronization," Proceedings of the IEEE, vol. 73, no. 10, pp. 1445-1467, October 1985; P. Ranganathan and K. Nygrad, "Time synchronization in wireless sensor networks: A survey," Int. Journal of UbiComp, vol. 1, no. 2, pp. 92-102, July 2010, and references therein). However, such approaches may have limitations in terms of precision or network size. Small networks can broadcast a high-precision reference clock to all nodes in the network (as is done, e.g., in GPS, or the transmission of a clock to cellular users). Many communication systems establish synchronization only within the accuracy of a symbol duration and/or the cyclic prefix duration, which often obviates the need for compensating for the runtime of signals, A. F. Molisch, "Wireless communications," second ed., Chichester, West Sussex, England: John Wiley & Sons Ltd., 2011. Narrowband coherent superposition can be achieved by phase synchronization, A. F. Molisch, "Wireless communications," second ed., Chichester, West Sussex, England: John Wiley & Sons Ltd., 2011, which, however, may contain an ambiguity in timing. However, when the expected precision of timing is much smaller than the propagation delays in the system (potentially even smaller than the inverse carrier frequency) and the network is large, the problem may require new solutions.

Precise timing of large, randomly deployed wireless networks can be challenging. Each node's timer may be derived from an independent oscillator, which may be affected by long/short term frequency drifts and jitter, J. Esterline, "Oscillator phase noise: theory vs practicality," Greenray industries, inc. report, April 2008. For example, if a timer is left uncorrected, its timing error growth can be modeled by a one dimensional random walk (sometimes modeled as a Wiener process). Even if two oscillators are perfectly matched in frequency and phase at the time instance $t_1^*$, the random frequency errors may lead to an error at time $t_2^*$ with a variance $\propto t_2^* - t_1^*$ ($t^*$ denotes absolute time) (The actual oscillator characteristics may be more complex than this description.) Mitigating the effect of this clock error, which may be critical for essential timing, may require very fast re-timing of the clocks.

A second issue may be the limitation on the precision of timing information exchange in finite-bandwidth channels with noise. The process of timing information exchange can be defined as the task of conveying information about a 'point' in time. Also, a band limited energy limited signal can, in principle, contain multiple 'points' which are similar. In addition, wireless channels can create ambiguity by generating multiple copies of the 'point', which can make the (time of arrival) TOA estimation error prone. With finite bandwidth, TOA estimation error—a measure of timing information may be directly effected by the transmission bandwidth (BW), Y. Shen and M. Z. Win, "Fundamental Limits of Wideband Localization Part I: A General Framework," Information Theory, IEEE Transactions on, vol. 56, no. 10, October 2010, pp. 4956-4980. If a node's TOA estimation error variance is $\sigma_{TOA}^2$, it may not achieve timing accuracy any better than $\sigma_{TOA}^2$, (unless some diversity is used). Due to the ease of achieving high TOA estimation accuracy, wide band signaling may be desirable for time transfer, C.-C. Chui and R. Scholtz, "Time transfer in impulse radio networks," Communications, IEEE Transactions on, vol. 57, no. 9, pp. 2771-2781, September 2009; A.-S. Hu and S. Servetto, "On the scalability of cooperative time synchronization in pulse-connected networks," Information Theory, IEEE Transactions on, vol. 52, no. 6, pp. 2725-2748, June 2006; however a very large BW may not be mandatory for some applications, this is discussed further below.

Higher BW may help TOA estimation in two ways. It may increase the slew rate of the signal, thus increasing the timing information content of the 'point'. It may increase the resolvability among multipath components and among points on the same signal.

The above issues may affect the timing between any pair of nodes. A significant further complication may occur in large networks with random deployment of nodes. Due to the size of the network, direct transmission of timing pulses from a "master" to all other nodes in the network may not be possible. Thus, the timing information may have to propagate through the network, possibly aggregating errors. Due to random deployment, network topology may be unknown, creating a need for a solution that is scalable and be robust to changes. A number of distributed algorithms were proposed for network timing. A. Giridhar and P. Kumar, "Distributed clock synchronization over wireless networks: Algorithms and analysis," Decision and Control, 2006 45th IEEE Conference on, December 2006, pp. 4915-4920, describes the mathematical foundation for an averaging based distributed consensus algorithm for timing, though neither a fully functional algorithm, nor fast re-timing was within the scope of this reference. A packet based distributed timing algorithm proposed in B. J. Choi, H. Liang, X. Shen, and W. Zhuang, "Dcs: Distributed asynchronous clock synchronization in delay tolerant networks," Parallel and Distributed Systems, IEEE Transactions on, vol. 23, no. 3, pp. 491-504, March 2012, uses an elegant clock table structure to acquire the timing information from nodes that are multiple hops away. However, due to the assumption of negligible TOA errors, and the sharing of clock tables and packet based time transfer, it may not be suitable for the aforementioned target applications. Other examples of packet based time transfer algorithms are L. Schenato and G. Gamba, "A distributed consensus protocol for clock synchronization in wireless sensor network," in Decision and Control, 2007 46th IEEE Conference on, December 2007, pp. 2289-2294 and M. Leng and Y.-C. Wu, "Distributed clock synchronization for wireless sensor networks using belief propagation," Signal Processing, IEEE Transactions on, vol. 59, no. 11, pp. 5404-5414, November 2011, however fast re-timing was not within their scope; furthermore L. Schenato and G. Gamba, "A distributed consensus protocol for clock synchronization in wireless sensor network," in Decision and Control, 2007 46th IEEE Conference on, December 2007, pp. 2289-2294 neglects propagation delay differences, and rate adjustment is not dealt with in M. Leng and Y.-C. Wu, "Distributed clock synchronization for wireless sensor networks using belief propagation," Signal Processing, IEEE Transactions on, vol. 59, no. 11, pp. 5404-5414, November 2011.

SUMMARY

A single wireless slave node may be in a timing virtual network (TVN) with neighboring wireless slave nodes. The single wireless slave node may store information indicative of the identity, link propagation delay, and channel signature of each of its neighboring wireless slave nodes. The single wireless slave node may repeatedly update a timing estimate based on the stored information and by performing a physical layer fast reference signal broadcast transmission and reception.

The single slave node may also store information indicative of a clock quality of each of its neighboring wireless slave nodes and/or a position flag of each of its neighboring wireless slave nodes.

The single wireless slave node may store information indicative of a clock quality of the single wireless slave node.

The single wireless slave node may determine the link propagation delay of each of its neighboring wireless slave nodes and/or the channel signature of each of its neighboring wireless slave nodes.

The single wireless slave node may generate multiple timing offset estimations and combine them using a weighted averaging. The weighted averaging may use weights and the combining may adaptively adjust the weights based on the stored information.

The single wireless slave node may improve the accuracy of the timing estimate by using both hardware acceleration and software digital signal processing (DSP) based on a timing correction calculation.

A timing virtual network (TVN) may include multiple single wireless slave nodes. The TVN may include one or more master nodes. Each master node may deliver reference timing signals to its neighboring wireless slave nodes without receiving or using timing information from any other wireless slave node in the TVN.

The wireless slave nodes may be in groups and each group may transmit or receive simultaneously.

At least one of the wireless slave nodes may not obtain timing information directly from any master node.

The master and wireless slave nodes may cooperate to provide distributed collision avoidance, distributed collision reporting, and distributed broadcasting.

Multiple timing virtual networks (TVNs) may each contain multiple master nodes. Each master node may having neighboring master nodes and a configuration that: stores information indicative of a clock quality of the master node; stores information indicative of the identity, link propagation delay, and channel signature of each of its neighboring master nodes; and repeatedly updates a timing estimate based on the stored information and by performing a physical layer fast reference signal broadcast transmission and reception.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Network Timing Algorithm—Phase I

The aim of this disclosure is to time a large (both in number of nodes and physical dimension) network of randomly distributed wireless nodes with very high precision. A large randomly distributed network may pose a more complex problem. The solutions presented may be applicable for small wireless networks with both random and non-random node distributions. Specifically, this may achieve timing with an accuracy much better than the runtime of the signals between nodes (better than, e.g., 1 ns), in a network with many (tens or hundreds of) nodes. Such a precisely timed network of wireless nodes can be a key component in distributed transmit beam forming, coordinated wireless jamming, precision wireless localization, tracking, navigation, and wireless channel characterization by real-time measurements.

Described below is a fully functional (describes both how the network is formed and how timing is maintained), completely distributed (in the view of the secondary or slave nodes) algorithm for the propagation of high-precision timing information through a large network. A pulse based physical layer broadcast technique may be employed that may will work in a distributed fashion for fast re-timing. (Although pulse based broadcast was considered in A.-S. Hu and S. Servetto, "On the scalability of cooperative time synchronization in pulse-connected networks," Information Theory, IEEE Transactions on, vol. 52, no. 6, pp. 2725-2748, June 2006, its approach of averaging out the propagation delays may require very large node densities for the law of large numbers to take effect.) Nodes may harvest and propagating timing information from and to the network by combining timing information both from multiple neighbors and multiple paths (In the case of UWB signaling, the dense multipath properties of UWB can be exploited). The strengths of physical layer pulse broadcasting, distributed consensus, and node intelligence can be integrated in a single set of algorithms. A distributed collision avoidance scheme may prevent interference between timing signals from multiple nodes.

Problem Definition and System Model

Consider the deployment of a large number ($N_S$) of wireless sensor nodes ("slaves") with low-precision clocks, such as crystal oscillators. Additionally there are $N_M$ master nodes with high precision clocks (e.g., atomic clocks) that serve as distributed timing references and initiators for key steps in the distributed timing algorithms.

Figure 1:
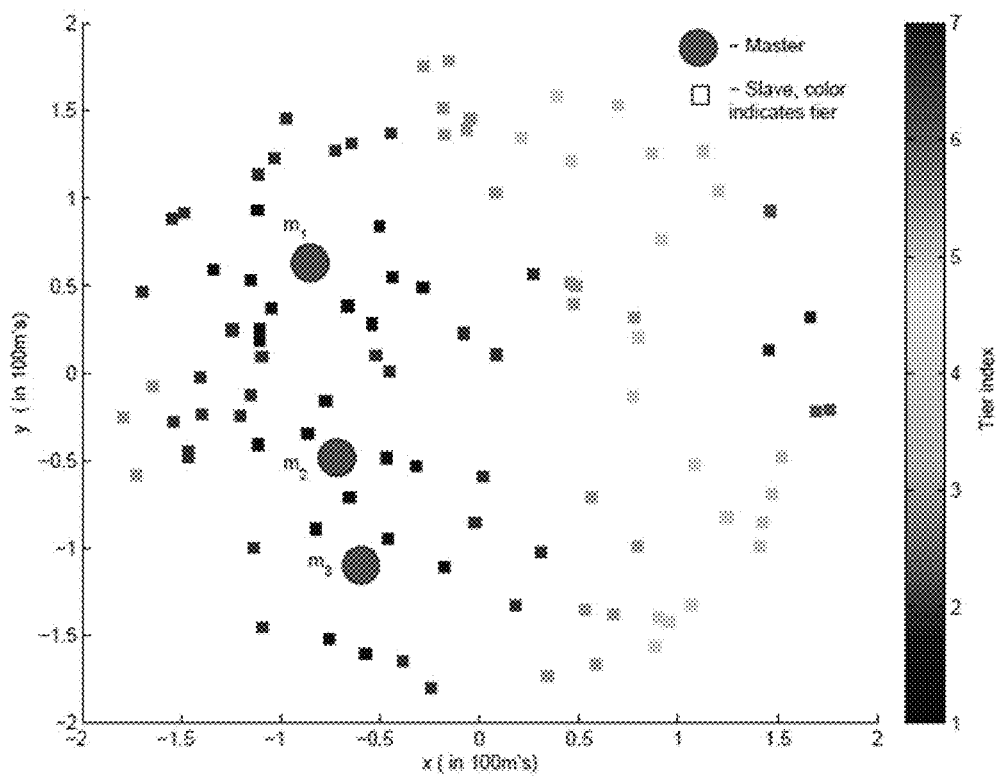
FIG. 1 illustrates an example network with $N_m=3$, $N_s=100$, and 10 neighbors per node in average.

FIG. 1 illustrates an example network with $N_m=3$, $N_s=100$, 10 neighbors per node in average. Node tier indices are illustrated by the color bar. Nearly 7 tiers are in the network.

Figure 2:
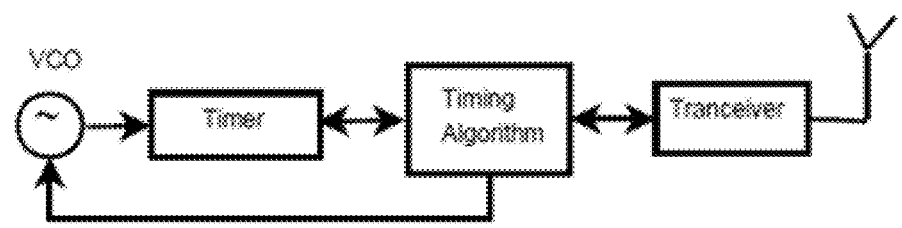
FIG. 2 illustrates an example of hardware components of a node.

FIG. 2 illustrates an example of hardware components of a node (masters and slaves alike). The timing algorithm may interact with the timer and the oscillator. Each node has its own oscillator and frequency correction circuit, yielding an adjustable frequency output. Let $f_k$ denote node k's oscillator's nominal frequency. This oscillator output may be used to run a timer, which is assumed to be digital, and counts the zero crossings of the oscillator output. (The counter resets to 0 once it reaches its maximum possible value.) At the time (absolute) instance t*, node k's current value of this local timer may be denoted by $C_k(t^*)$. A goal may be to ensure that, at any given time instance t* (absolute), $E\{(C_k(t^*)-C_j(t^*))^2\}<\sigma_{tol}^2$, $\forall i \neq j$, where $\sigma_{tol}^2$ is the timing error tolerance. Local time instances, and local time differences may be denoted by t, and τ, respectively. Corresponding values on an absolute time axis may be denoted by t*, and τ*. For many applications, it may be sufficient to time the whole network to some common local reference, i.e., in this case the common local time axis of all the master nodes. Mapping to an absolute reference (if required) can then be achieved simply by mapping the timing of the master nodes to the global reference. To simplify notation, the time of the master nodes may be called the "absolute" time. A network which is already timed to some local time axis can be mapped to the absolute time axis by mapping the reference nodes to absolute time. In principle, making one of the reference nodes to satisfy $C_k(t^*)=t^*$ may be sufficient to map the network to absolute time.

Inside the physical network, a virtual network (namely the timing virtual network, TVN) may include nodes, links, and the algorithms that keep timing. A purpose of a TVN may be to establish and maintain timing in the network. The network used for data communication can be different, both in the physical layer and in topology. In the proposed solution, the node hardware may be designed based on ultra-wide band transceivers, although UWB is not mandatory.

By definition, only the nodes that are connected to at least one master may be part of TVN (through any numbers of hops). However, this may not mean that the network graph is strongly connected. In some cases, a TVN can include more than one component (dis-joint sub graphs). However these sub graphs may be strongly connected and have at least one master per sub graph.

Nodes that are not part of the TVN may not be timed, and hence may be ignored. Below, $\{L\}_{i,j}$ is defined as a binary variable, which may be sufficient for practical purposes. However, $\{L\}_{i,j}$, in general can be defined as a continuous variable as well (wireless connectivity can be modeled as a continuous variable).

Within the scope of this section, the link matrix L defining the connectivity (topology of the network) may be defined by (also known as the adjacency matrix in graph theory)

$$\{L\}_{i,j}=0, \text{ if } i=j \text{ or } \gamma_{i,j}<\gamma_{TH}$$

$$\{L\}_{i,j}=1, \text{ if } \gamma_{i,j} \geq \gamma_{TH}$$

where $\gamma_{ij}$ is the signal-to-noise ratio (SNR) of the link between nodes i and j, $\gamma_{TH}$ is the SNR threshold for wireless connectivity. This threshold may be the minimum SNR that may be required for (i) signal acquisition and (ii) meaningful transmission of timing information. The nodes in the network may be grouped into sets called tiers, $T_i$ where a node $k \in T_i$ if there is at least one $l \in T_{i-1}$ such that $\{L\}_{k,j}=1$. By definition, tier 0 may consist of all the master nodes. Stationary or quasi stationary channel conditions are assumed. Node movements and changes of the propagation channel could be handled by this framework, by a subset of the aspects in Phase I, and a node's "personal responsibility", described below.

General Description of Timing Algorithm

The following guidelines were set in arriving at a solution:

Simple set of rules followed by each node.

Only local interactions are allowed (interactions to the neighbors).

Each node is responsible for achieving it's goals, self sustaining.

Minimize centralization, information is to be pulled in by each node not to be pushed out from a center.

These guidelines led to the formation of the following characteristics: self evolution, sustainability, scalability, distributed architecture, individual and self caring nodes.

However, some centralized coordination among the masters may be exploited for speed and for better control, without the expense of the distributed structure. Master nodes may be inevitable for keeping a precision timing reference for the slaves. Otherwise a global consensus-based algorithm may let the whole timing network float away with an arbitrary global reference.

The algorithm may have two phases. Phase I may create and initialize a TVN among a group of deployed nodes. Phase II may maintain accurate timing in the network through continuous adjustments.

The network timing algorithm may handle the following scenarios.

1. Fresh deployment: Deploying a group of masters and slaves on an area where no prior TVN is established. Establishment of a new timing network.

2. Continuous re-timing: Continuous timing adjustment of a slave after network is established.

3. Slave addition: Adding slaves to an existing sensor network.

4. Master addition: Adding master nodes to an existing network.

5. Group addition: Adding a group of masters and slaves to an existing network.

Phase I may handle scenarios 1, 3, 4 & 5, and may become important since it creates the TVN. The second scenario may be handled by Phase II. These scenarios describe a very general problem, not all these scenarios may be found in different network timing problems.

In Phase I, each node may learn its neighbors (nonzero entries in a row/column of the link matrix, L) and the propagation delays of the associated links (node may learn the propagation delays of many different multipaths). This may be achieved through two-way packet and timing pulse exchanges with neighbors. See C.-C. Chui and R. Scholtz, "Time transfer in impulse radio networks," Communications, IEEE Transactions on, vol. 57, no. 9, pp. 2771-2781, September 2009 (packet transmissions may not be used during Phase II). Each node k may keep a parameter, $ClkQ_l$, as a measure of the latest quality of the timing information of its neighbor l. ClkQ's may be continuously updated. Node k may be initialized when it knows its neighbors and the correct propagation delays. Each node may also maintain a position flag, which indicates whether a node has moved beyond a displacement threshold $d_{th}$. ClkQ: Each node may maintain ClkQ to denote its current timing quality. This value may be exchanged among neighbors whenever there is a packet transmission opportunity among them. Ideally this may be $ClkQ_l = E[C_l(t^*) - t^*]^2$. However, no node may measure $C_l(t^*) - t^*$ (it may be impossible for a node to measure its own timing performance). Therefore, $ClkQ_l$ may be substituted with practicable estimates suitable for a distributed algorithm (described below).

Position flag: To handle node environment changes due to node mobility, each node may also be able to detect its own movements (e.g., by an accelerometer), and may include a position flag (PF) in its transmissions to indicate to other nodes whether it has moved after it's last initialization. If PF is changed, it may be the node's own responsibility to re-initializes itself with its neighbors. Until re-initialization is complete, the node may not participate in the fast re-timing process (i.e., the Blink cycles as described below). PF may be set to 1 if $d^{acc}(t) > d_{th}$ where $d^{acc}(t)$ displacement estimate calculated from the $\ddot{x}(t), \ddot{y}(t)$ measurements from an accelerometer.

Node k may also record its neighbors' current channel signatures, and may learn its tier. Since the link matrix and tier structure may not be known at the beginning of Phase I (however this knowledge may not be collected in a centralized fashion), all of this may be achieved through a distributed algorithm that contains mechanisms to handle collisions during the packet exchanges. A suitable modification of Carrier Sense Multiple Access (CSMA) may be used. More details are given below.

Once the TVN is formed, the timing information from the masters can be propagated repeatedly through the network. In a naive approach, this may be done in a sequence, one tier transmitting at a time. This may mean each tier has to idle for $(N_T - 1)\tau_B$ (where $N_T$ is the number of tiers and $\tau_B$ is the time gap between broadcasts). However, the least idle time may be achieved by letting odd and even tiers transmit alternatively so that the delay between timing updates for each node is only $2\tau_B$. This approach may have the further advantage that it can be implemented in a completely distributed fashion, as knowledge of $N_T$ is not necessary. Nodes may use physical layer broadcasting, and nodes in the same tier can transmit simultaneously. In the case of UWB signaling, fine delay resolution can be leveraged to separate the multiuser multipaths. In other words, the received signal seen by a node may consist of multiple resolvable pulses from both multiple neighbors and multipaths. Since the receiving node may know (from Phase I) the multipath signatures from each neighbor separately, it may now harvest timing information of each resolvable multipath from the aggregate received signal.

Multiuser signal separability: In order to increase the separability of multiuser multipaths, TDMA or CDMA (or hybrid) techniques can be applied to increase the orthogonality among multiuser signals. In case of TDMA, random TDMA slot assignment for nodes may be the suitable approach to preserve the distributed operation.

The following describes an example of Phase I and Phase II algorithms.

Timing Algorithm—Fresh Deployment (Phase I)

Figure 3:
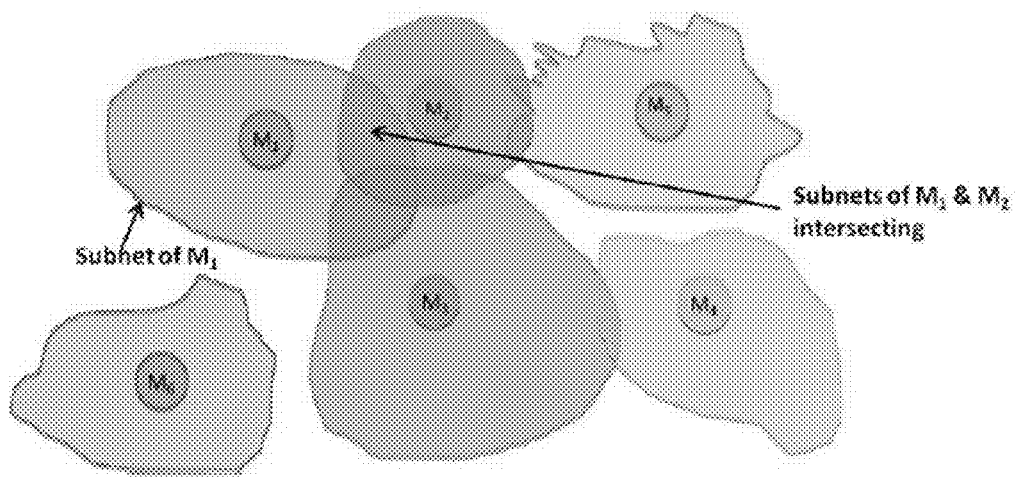
FIG. 3 illustrates an example of master subnetworks and collision between neighboring masters.

FIG. 3 illustrates an example of master subnetworks and collision between neighboring masters. Some masters may be collision free and may start the TP right after sending SOTPR.

Figure 4A:
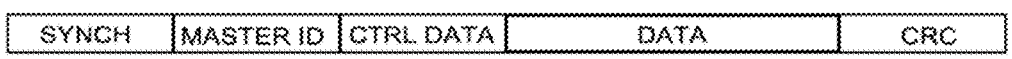
FIG. 4A illustrates an example of a master start of timing procedure request (SOTPR) signaling format.
Figure 4B:
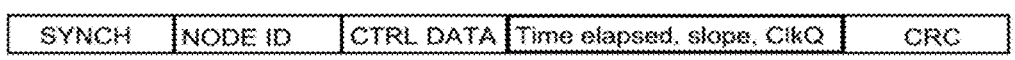
FIG. 4B illustrates an example of a slave SOTPR reply signaling format.

FIG. 4 illustrates an example of a master SOTPR signaling format. FIG. 4B illustrates an example of a slave SOTPR reply signaling format. Time elapsed is the HW processing delay of the slave.

Master Starting Timing Procedure with Collision Avoidance

All masters may be timed to the same reference. The following is an example timing procedure with collision avoidance that may be implemented:

A.1 Masters may simultaneously broadcast a start of timing procedure request (SOTPR) signal. SOTPR may have sufficient information for the receiver to estimate the master clock rate relative to the receiver clock rate (skew) and the start of a time slot.

A.2 Surrounding slaves that identify the SOTPR signal may estimate the SNR of the link between them and the master. If the SNR is larger than, $\gamma_{TH}$, the slave may do a skew calculation, adjust its clock, estimate the starting point of a time slot, and accept the sender as its master. It can furthermore perform synchronous data detection on the master's signal, which may contain the master ID and other information.

A.3 If SNR is smaller than $\gamma_{TH}$, the slave may continue to listen, in order to identify a set of preferred candidate neighbors to rely on for timing. In this state, a slave may be listening to all the transmissions on the air, which could originate from other masters or slaves).

A.4 Slaves with SNR>$\gamma_{TH}$ that could not identify SOTPR may report collisions between master packets (complaint) in the subsequent time slots. This collision reporting may be done during a complaint window of length $N_{col}$ time slots, after the SOTPR. The position of the complaint signal within the complaint window may be determined by random time hopping. In this way, a master may not only learn of the existence of collisions, but may have a rough estimate of their number.

A.5 If the number of complaints in the complaining period $C \le C_{TH}$ (collision threshold), the master may send start of timing procedure message (SOTP) in the next time slot.

A.6 Slaves that synchronized themselves to a master (w.r.t rate and time slot alignment) may now broadcast a SOTPBcast message in the subsequent $N_{bro}$ time slots using a random time hopping technique, similar to the one used for complaining. Masters that backed off may use this message to learn that their competing master has started timing procedure.

A.7 If $C > C_{TH}$, the master may wait for a random backoff of $1+N_{bro}+(2+N_{col}+N_{bro})b$ time slots, where b a random integer ($0 \le b \le b_{max}$), and may retransmit SOTPR if no SOTPBcast message is detected during the waiting period.

A.8 If SOTPBcast message is detected during the waiting period in A.7, master may pause its attempt to start a timing procedure and may go to pause mode. In order to recover from pause mode, a master may continue to listen to the channel to learn when its conflicting master ends its timing procedure.

A.9 After transmitting SOTP, the master may wait $N_{bro}$ time slots and enter its timing procedure (TP). An example of this is described below.

Figure 5:
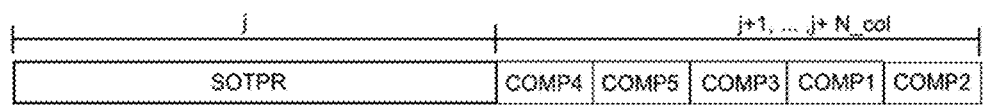
FIG. 5 illustrates an example of a slave node's collision complaining mechanism.

FIG. 5 illustrates an example of a slave node's collision complaining mechanism.

Figure 6:
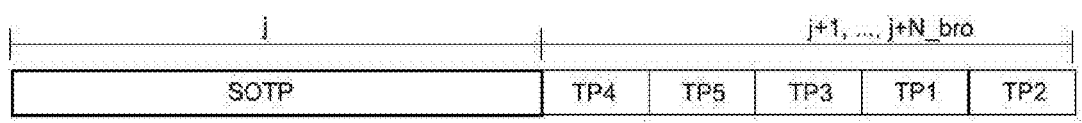
FIG. 6 illustrates an example of distributed broadcasting by slaves before a master's timing procedure starts.

FIG. 6 illustrates an example of distributed broadcasting by slaves before a master's timing procedure starts.

Figure 7:
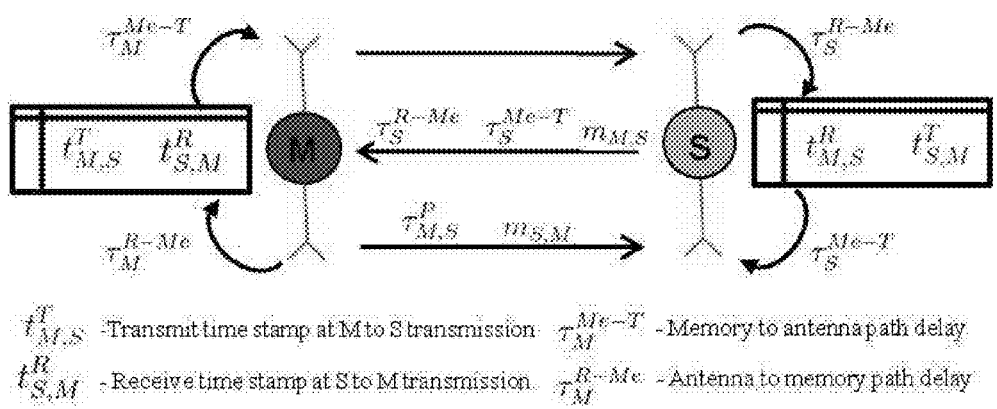
FIG. 7 illustrates an example of a two-way timing technique.

FIG. 7 illustrates an example of a two-way timing technique. Time stamps in the node's memory and the device and propagation time delays are shown. $m_{S,M}$ is master's estimate of slave's clock rate. The same technique may be applicable between any participating pair of nodes (master-slave and slave-slave pairs).

Master Timing Procedure (TP)

Packet Based Approach

The following is an example of a master timing procedure using a packet based approach that may be implemented:

B.1 Master may save its current time stamp, $t_{M,S}^T$, (FIG. 7) and broadcast a SYNCH message carrying sufficient information for extracting it's clock rate (e.g., a sequence of UWB pulses at predetermined spacing).

B.2 A slave receiving SYNCH may extract the master clock rate and correct its own clock accordingly. It may further estimate the time of arrival (TOA) of the SYNCH message and creates a time stamp $t_{M,S}^R$.

B.3 All receiving slaves, using for example a carrier sense multiple access collision avoidance (CSMA/CA) strategy, may reply to the master with a SYNCH_R message, which may contain $\tau_S^{R-Me}$, $\tau_S^{Me-T}$, and time stamp, $t_{M,S}^R$. (The delay between the radio signal arriving at the antenna and the latching of the time stamp $t_{M,S}^R$ the memory may be $\tau_S^{R \to Me}$. The delay between the latching of the time stamp $t_{M,S}^T$ in the memory and the radio wave actually leaving the antenna may be $\tau_S^{Me \to T}$.)

B.4 Upon receiving a valid SYNCH_R message, master may calculate the propagation delay $\tau_p$ of the master-slave link, and the timing offset ($\tau_e$) of the slave using its own $\tau_M^{R \to Me}$, $\tau_M^{Me \to T}$, and the TOA estimate of the SYNCH_R message, $t_{S,M}^R$.

B.5 Master may send $\tau_p$ and $\tau_e$ to the slave.

B.6 All slaves that can overhear the transmission in B.3 and B.5 may use the information for their self learning of their neighborhood. This can dramatically increase the efficiency of the protocol, as it may provide to the slave nodes information about their neighbors' positions (delays) without requiring additional packet exchanges.

B.7 Masters may allow $N_{TP}$ time slots for the slaves to complete timing procedure through CSMA. After $N_{TP}$ time slots, the master may broadcast another message (MTR) querying whether any node still requires timing procedure.

B.8 Slaves still requiring timing procedure may reply to MTR with a request for timing procedure (RTP). RTP may use similar time hopping technique used for transmitting complaints.

B.9 If at least one RTP message is detected by the master, it may re-enter timing procedure (B.1-B.9).

B.10 If no RTP message is detected, master may end its timing procedure by broadcasting end of timing procedure message (EOTP). Master may also assign broadcast order for slaves (time hopping code).

B.11 Slaves may distributedly broadcast EOTP in a EOTPBcast message composed similar to the SOTPBcast message in A.6, but with predetermined time hops. This may end a master's timing procedure.

Figure 8:
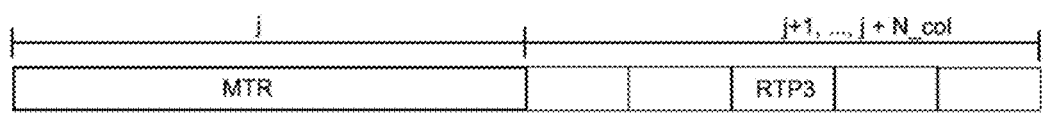
FIG. 8 illustrates an example of a master finding out whether additional timing service for nodes is necessary.

FIG. 8 illustrates an example of a master finding out whether additional timing service for nodes is necessary.

Figure 9:
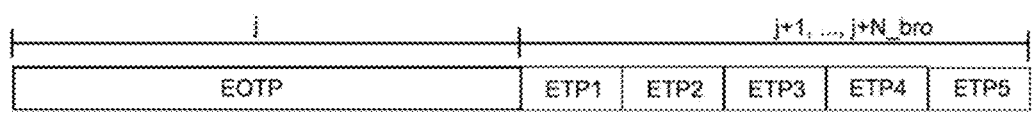
FIG. 9 illustrates an example of a distributed broadcast of an end of timing procedure message.

FIG. 9 illustrates an example of a distributed broadcast of an end of timing procedure message.

Two way timing procedures may require the accurate calibration of the node dependent parameters $\tau_M^{R \to Me}$, $\tau_M^{Me \to T}$, $\tau_S^{R \to Me}$, $\tau_S^{Me \to T}$, if antenna to antenna propagation delays are to be estimated. At the end of the procedures A and B, the following may be achieved:

1. Masters may know their slaves, and conflicting masters
2. Slaves may know their candidate master/s and some neighboring slaves
3. The propagation delays for all (not-strictly) master-slave links and some slave-slave links (slave-slave propagation delays can be estimated through triangulation or slave-slave indirect timing) may be known by the nodes sharing the link. Note that the slaves' operational mode during A and B is named as Dinit mode.

HW Accelerated Two-Way-Timing

This section explains an example of how HW acceleration can be performed on two-way-timing in Phase I.

1. A pair of nodes P and Q may enter into tow-way-timing mode after negotiating through packet communication. Negotiation may determine P as the first to transmit, Q may be in receiving mode.
2. P may fire a synch signal (e.g., an m-sequence) and switched to receive mode.
3. Upon detecting P's signal, Q may send a automatic reply with a fixed delay (very short HW delay) (process is called delayed reflection)
4. Upon receiving Q's reply, P may send an automatic reply to Q.
5. All transmit, receive times may be recorded locally (no time stamp exchange may be required).
6. Steps 2-4 may complete one full cycle. One full cycle (may require minimum of 3 transmissions) may enable both nodes to calculate propagation delays independently (propagation delay is defined below). Channel symmetry may be assumed. If hardware delays are calibrated and invariant from node to node, antenna-to-antenna propagation delays can also be estimated by both nodes without any packet exchanges.
7. Steps 2-4 can be repeated multiple times to increase estimation accuracy.
8. After propagation delay estimates. Nodes can achieve timing by exchanging at least one one-way timing signal initiated at their local clock's time origins (some periodical intervals the nodes can maintain w.r.t to their local clocks).

Slave Self Timing

After completion of the initial round (A & B), there may be slaves that were left out (unsuccessful in doing a TP), either not being in the coverage of a master or failed to do TP due to some unresolved collisions. These left-out slaves (which may make up a large portion of a practical network) may be responsible for joining a TVN and pulling the timing information from the network (pulling of information may be a key aspect of a self evolving network as opposed to centralized pushing of the timing information).

The following is an example of slave self timing that may be implemented:

C.1 Left-out slaves may move to self timing mode (Self-Dinit) after a wait period ($T_{Dinit}$).
C.2 In both Dinit and SelfDinit modes, slaves may continuously listen to transmissions on the air to learn their neighbors (CandList).
C.3 Slave may send a request for a timing procedure (RLTP) to the best candidate in it's list (ranked by the $ClkQ_S$). This step may be repeated with random backoffs until it is successful.
C.4 A slave receiving an RLTP may reply with a timing information message (TI) if it has already joined the TVN through at least one link.
C.5 The requesting slave may calculate the link propagation delay, $\tau_p$ and share it with the helping slave. Again, all slaves that can overhear this message may utilize it t, increase the knowledge of the neighborhood and enable computation of the delays to neighbor nodes. Instead, both slaves can make use of HW accelerated two-way-timing mode as well.
C.6 A slave may repeat this process until it times the links with all the nodes in its CandList. Note that at the end of Phase I, the candidate list may be consistent with the nonzero entries of the link matrix associated with a particular node.

Figure 10:
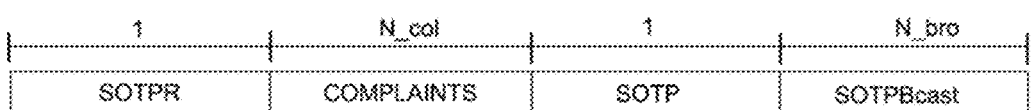
FIG. 10 illustrates an example of a complete signaling sequence between master and slaves in preparing to enter a TP.

FIG. 10 illustrates an example of a complete signaling sequence between master and slaves in preparing to enter a TP.

As the result of A, B, and C, a TVN may evolve. Each node may have a list of it's neighbors and estimates of the propagation delays for the network links. Also, the nodes in the TVN may have achieved coarse timing, which may be necessary for the operation of the next stage of the timing algorithm.

Timing Algorithm—Continuous Adjustment (Phase II)

The following is an example of a timing algorithm using continuous adjustment that may be implemented:

D.1 Before beginning the continuous adjustment algorithm (called the Blink algorithm), the nodes may learn their tiers. An example of a tier-learning algorithm is explained at the end of this section.
D.2 Masters may initiate the Blink cycles by simultaneously broadcasting short duration timing pulses (e.g., UWB pulses). This process is called Blinking. The Blink signal may include short timing signals (same timing signal may be used in Phase I for recording the channel signatures), allowing the receiving node to extract the rate and timing offset of the transmitting node. (Accurate rate extraction with short signals may be difficult, therefore rate extraction can be excluded in Phase II. Due to the fast timing correction in Phase II, clock errors due to rate mismatches and random errors may be corrected continuously while these errors are still small.) Upon receiving this Blink signal (distinguishable from usual packet transmissions) from tier 0, the nodes in tier 1 may do a Blinking after a constant time delay $\tau_B$. This process may continue towards the last tier, $N_T-1$. Once started, the tiers may repeat blinking every $2\tau_B$ time. Continuing this may create a pattern of alternating Blinking in the network, where odd and even tiers Blink out of phase and every $2\tau_B$ time.
D.3 Receiving nodes may make estimates of their neighbors' time of arrivals relative to their own local clocks, $\{t_k^e\}_{k=1}^{N_{nei}}$ where $N_{nei}$ is the number of transmitting neighbors.
D.4 Using its links' propagation delays (learned in Phase I), a receiving node may estimate the expected arrival times of its neighbors' Blink signals as $\{\tilde{t}_k^e\}_{k=1}^{N_{nei}}$. Comparing this with the actual arrival time estimates, $\{t_k^e\}_{k=1}^{N_{nei}}$, a node may calculate its time reference offsets from its neighbors as $\{t_k^e - \tilde{t}_k^e\}_{k=1}^{N_{nei}}$. The receiver may adjust its timer by some function of the computed offsets; in the simplest case by a linear combination, $\Sigma_{k=1}^{N_{nei}} w_k (t_k^e - \tilde{t}_k^e)$, where $w_k$ are some real numbers summing to unity. (1 In the examples presented, $w_k = 1/N_{nei}$.)
D.5 This Blinking procedure may be continued as needed.

Since half-duplex nodes were assumed during the Blink procedure, tier i nodes may hear only from tiers i+1 and i−1.

Tier Learning

During Phase I, nodes can exchange their tier indices. However, this may only be the additional information that the nodes can easily harvest. However, nodes may not need to know their absolute tier indices to participate in the Blink cycles (Phase II). Nodes may only need to know their transmit and receive phases in the Blink cycle. This can be done by the following approach. All slaves may be put into a receive mode at the beginning of blink cycles. Masters may initiate blink cycles by broadcasting the blink signal. Nodes receiving blink signals (either from master or their neighbors) in cycle 2i may decide to transmit in cycle 2i+1.

This rule may be sufficient to establish alternating blinking odd and even tiers in a distributed fashion in the entire TVN.

Slave Addition

If the node has no urgency to establish timing, the following example may be implemented:

E.1 Start sensing the channel to identify the networks transmission time slots (specifically to identify the time slots where a RLTP can be send).

E.2 Continue to sense the channel to identify candidate nodes, by listening into ongoing transmissions. In this phase, the node may try to extract timing information as well as ClkQ+Node ID+control bits from the data packets that it is over hearing.

E.3 Initiate packet based or HW accelerated 2-way timing transmission with a candidate/candidates.

E.4 Initiate transmissions to the neighbors to update them with the new node's timing information.

E.5 Listen to the channel for some period to identify other neighbors and repeat 5.

E.6 Collisions may be suspected if no acknowledgment is received for an upward transmission and addressed by using a random back off.

After step E.2, this may be very similar to how left-out slaves handle timing by 2 way transmission.

If the node urgently needs to do timing, the following example may be implemented:

E.7 Added slave may broadcast a synch request to its neighbors (broadcast signal may be long enough to capture a wakeup period of a neighbor node in the network since the slave may not know the networks transmission time slots yet).

E.8 Neighbors that received this synch request may reply to the added slave.

E.9 Added slave may choose its candidate nodes and correct it's timing and complete the timing for the newly formed links by 2-way transmissions.

Master Addition

The following example may be implemented:

F.1 Start sensing the channel to identify the networks transmission time slots.

F.2 Master broadcasts a start of timing procedure request to get its chance to do a timing procedure.

F.3 Slaves that accept this master may now enter a synch phase and start listening to the channel for synch packets involving this master (until the synch process ends).

F.4 Master may reply the slaves with new timing information.

F.5 Slaves participating in this process may update their timing tables. This may be similar to the TP carried out by a master above.

Group Addition

The following procedure may be implemented:

G.1 Masters in the group may enter a timing procedure using the method described in A.

G.2 And follow the procedure for master addition.

G.3 After all new masters have completed their timing procedure, or after a predetermined waiting time, the slaves that have been left out, may adopt the procedure for Slave addition.

Protocols for group addition may be important because: a group addition may cause significant changes in the network connections and groups of nodes can be added to an existing network (adding nodes to scale up sensor density, or adding nodes to account for sensors that are disabled, or adding a new type of sensing devices based on requirements of the situation).

Phase I may be repeated (at a much slower rate than the Blink cycles), in order to repeatedly correct and adjust for the changes in the TVN.

Proper Use of Packet and Pulse Transmissions

In Phase I, the nodes may both use packet and pulse transmissions. Packet transmissions may be used for the data exchanges among neighbors during learning the environment through node intelligence. Phase one transmissions that are deemed for timing purposes (two way timing described above) may send timing information signals (e.g., UWB m-sequence) preceded or followed by packet transmissions. However, in a second approach (described in this document), which is proposed for hardware acceleration, a pair of nodes may enter a hardware accelerated mutual timing procedure which may use only timing signal transmissions. However before entering a hardware accelerated phase, they may agree to enter timing procedure through packet communications.

Signal design and bandwidth utilization can be different for timing signals and packet communication signals. For example, packets could be transmitted through a WiFi physical layer and the timing signal can be a UWB m-sequence.

Phase II may use timing signal transmissions only (e.g., UWB m-sequence). Phase II may not involve packet communications to minimize the processing time. This may be a key requirement in Phase II to achieve fast re-timing. Phase II may make use of HW acceleration for signal processing in estimating (time of arrival) TOAs. Phase II may also use software DSP for fine tuning of it's TOA estimates details are found in 11.

Timing Signal Design

Timing signal may provide sufficient TOA estimation resolution in both Phase I and II. Both phases can use the same timing signal. TOA estimation resolution may not mean the ability to resolve multipaths in a dense multipath channel (where the channel resolution is directly proportional to the inverse bandwidth of the signal). This is stated because identifying the first arrival path or any particular arrival path may not be a requirement for achieving timing between a pair of wireless nodes (details are in 12). The basic requirements may be:

1. The reciprocity (i.e., symmetry) of the channel (no other restrictions on the channel like LOS or NLOS conditions may be placed)

2. The channel has not changed significantly between recording the channel signature (during Phase I, or self initiated re-initialization) and the Phase II.

However, practically having a large BW helps hardware acceleration and may improve performance under noise (noise performance can be increased by other means that increase signal processing gain). A TOA detection technique may be cross correlation at the receiver. For this, a set of sequences with both good peak-autocorrelation-to-peak-side-lobe ratio and peak-autocorrelation-to-peak-cross-correlation ratio may be required. Multiple sequences may be required, since Phase II may use simultaneous broadcasting of timing signals by multiple nodes. m-sequences and gold sequences may be good choices for the sequences. In order to improve orthogonality among multiuser signals, neighbors can use TDMA slots, where a node randomly pick a TDMA slot from a predetermined number of available TDMA slots and assigns it to itself. This TDMA slot choice may be an additional parameter that will be exchanged during Phase I. Orthogonal multitone signaling may also be a possible choice for the signal: where the available BW is divided into many orthogonal tones and these tones are divided into multiple subsets (each subset also spanning the entire BW) and one set is randomly picked by a node.

Long sequences may be used improve signal processing gain.

BW Requirement

As mentioned above, UWB may not be a strict requirement for precision timing. However, larger BW may be required when time of flight measurements are to be related to distances (here, high multipath resolution to precisely separate the first arrival path may be necessary). Precision timing in dense multipath channels with smaller BW (smaller than the inverse of the required timing accuracy) may be possible if the 2 conditions discussed above are satisfied and sufficient SNR is available. However, achieving higher accuracy with smaller BW may require additional signal processing. Hence, the HW complexity may be increased. Also, larger BW may enable HW acceleration.

TOA Estimation Improvement by Smoothing

This technique is explained using cross-correlation based TOA detection as an example.

The cross correlation function at the output of a TOA estimator may be bandlimitted. Using sufficient number of Nyquist rate samples, the analog version of the cross-correlation function can be reconstructed. This reconstruction may help to improve the TOA estimation accuracy to much smaller values beyond the digital sampling interval (the peak detection accuracy one can achieve through a real-time correlator—i.e., HW accelerator—may be upper bounded by Ts/2 where Ts is the digital sampling interval). A close approximation to the analog cross correlation function can be obtained by applying sinc-function interpolation on the coarse correlator samples (resampling the corelator out put at a higher rate than the Nyquist rate).

The TOA estimate with out re-sampling may be $t_{TOA}$ (estimate using pure hardware acceleration based correlation peak detection), and the fine tuned TOA estimate with re-sampling may be $t_{TOA}^{RS}$. If the additive noise for a moment is ignored, $t_{TOA} - t_{TOA}^{RS}$ may be a constant when conditioned on the channel response. Therefore, the receiver can use software DSP processing to accurately estimate $t_{TOA} - t_{TOA}^{RS}$ (this may require very long processing times. Processing times in the order of ms are considered long). Once an accurate estimate of $t_{TOA} - t_{TOA}^{RS}$ is available, and when the propagation channel has not changed, this estimate can be applied on $t_{TOA}$ in the subsequent blink cycles to reach fine TOA resolution at HW acceleration speeds. The new TOA estimation accuracy, however, may be limited by the additive noise level in the correlation out put samples, which can be mitigated by increasing the processing gain (e.g., longer m-sequence, etc.). SW based DSP estimate of $t_{TOA} - t_{TOA}^{RS}$ may happen continuously, even though this estimate has ms order time lag from the HW estimate, to detect the change in the channel and update the value of $t_{TOA} - t_{TOA}^{RS}$ continuously.

Two Way Timing Procedure

Two way timing procedures may require the accurate calibration of the node dependent parameters $\tau_M^{R \to Me}$, $\tau_M^{Me \to T}$, $\tau_S^{R \to Me}$, $\tau_S^{Me \to T}$, if knowing the shortest antenna-to-antenna propagation delay is necessary (localization applications). However, if two-way-timing timing is for pure synchronization purposes, many calibration overhead may be avoided.

Defining: Propagation Delay. Minimum Conditions for Timing

Figure 11:
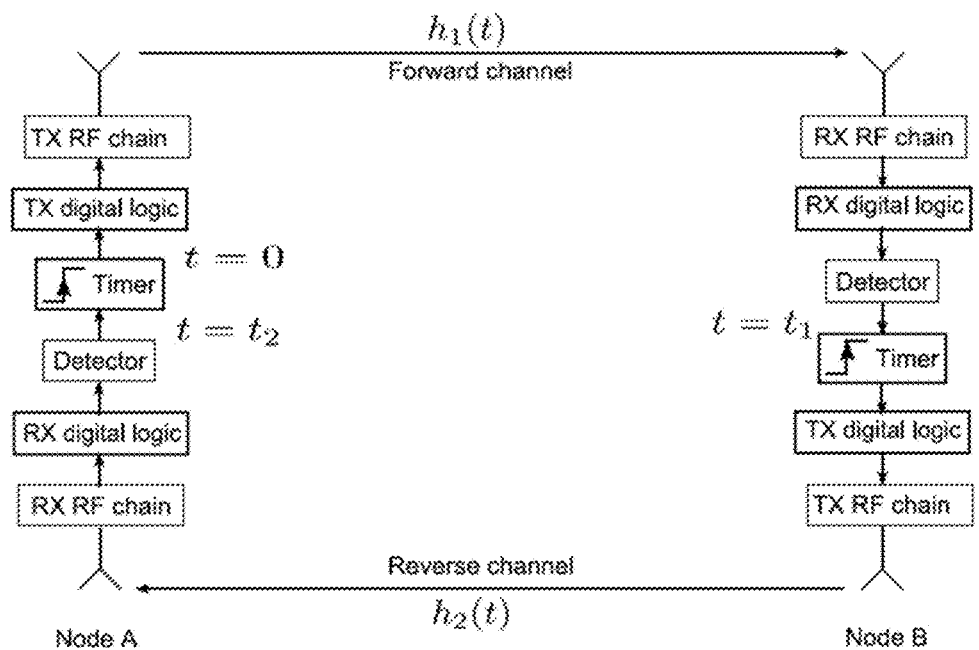
FIG. 11 illustrates an example of a timing hardware model.

FIG. 11 illustrates an example of a timing hardware model. FIG. 11 describes timing information exchange between two wireless nodes A and B. Both nodes have a timer and the up arrow is used to denotes time instances. At t=0 A initiates a transmission in its TX digital logic, it propagates through TX RF chain, and the antenna of node A. $s_A(t)$ denotes the radiated signal from A's antenna, $h_1(t)$ is the forward channel impulse response. The received signal, $s_A(t) \otimes h_1(t)$, propagates through RX RF chain, RX digital logic, to the detector of node B. B's detector initiates a transmission at $t=t_1$, which propagates through TX digital logic, TX RF chain of B, and radiated as $s_B(t)$. The received signal, $s_B(t) \otimes h_2(t)$, propagates through RX RF chain, RX digital logic, and detected at node A at $t=t_2$. Node A knowing the value of $t_2-t_1$ is necessary for timing (e.g., once this value is known, a one way timing pulse from B-initiated at an already agreed value of B's local time—is sufficient to match both timers).

Figure 12:
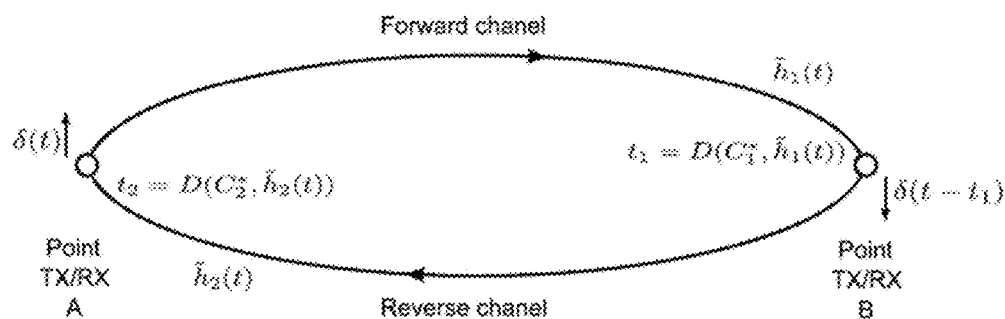
FIG. 12 illustrates an example of a timing point TX/RX model.

FIG. 12 illustrates the extracted timing point TX/RX model. In FIG. 12, the timing nodes are denoted by point TX/RX. A point TX/RX may have a timer and may do 2 operations:

1. Transmit a $\delta(\bullet)$ function
2. Perform detect operation $\delta(t-t^*)=D(C^*,h(t))$ where $C^*$ is a unique point $[t^*,h^*]$ in the curve $h(t)$ (the mapping between $C^*$ and $t^*$ is one-to-one if $h(t)$ has finite support).

Both these operations may be instantly referenced to their time axis (it has no processing delays). In the abstract model, the channel may represent the complete signal propagation path between the two timers (point TX/RX). Therefore, $\tilde{h}_1(t)=s_1(t) \otimes h_1^{TX}(t) \otimes h_1(t) \otimes h_2^{RX}(t)$ and $\tilde{h}_2(t)=s_2(t) \otimes h_2^{TX}(t) \otimes h_2(t) \otimes h_1^{RX}(t)$ where $s_1(t)$ and $s_1(t)$ are the signals the nodes in the first diagram 'wished' to transmit (i.e., $s_1(t) \otimes h_1^{TX}(t)=s_A(t)$ and $s_2(t) \otimes h_2^{TX}(t)=s_B(t)$). In this model, Point TX/RX A transmits $\delta(t)$, point TX/RX B receives $\tilde{h}_1(t)$, detects a unique point $C_1^*$ as $\delta(t-t_1)=D(C_1^*,\tilde{h}_1(t))$, and transmits $\delta(t-t_1)$. A receives $\tilde{h}_1(t)$ and detects the unique point $C_2^*$ as $\delta(t-t_2)=D(C_2^*,\tilde{h}_2(t))$. Now, A can measure the total flight time $t_2-t$. However, A may not measure $t_1-t$ or $t_2-t_1$ individually without additional information. In order to relate their timers, knowing either $t_1-t$ or $t_2-t_1$ may be necessary.

Detection process $D(\bullet, \bullet)$ may use techniques such as, peak cross correlation detection, amplitude threshold detection, and energy threshold detection. However, in a broader sense, $D(\bullet, \bullet)$ may be a pattern recognition problem and the aforementioned methods may only be practicable approximations. The following may be sufficient conditions for knowing $t_1-t$ or $t_2-t_1$ separately:

1. Symmetric channel: forward and reverse channels (according to the point TX/RX model) are identical (i.e., $\hat{h}_1(\bullet)=\hat{h}_2(\bullet)$.
2. There exists a point $C^*$ in $\hat{h}_1(\bullet)$ OR $\hat{h}_2(\bullet)$) which both A and B can uniquely identify (i.e., $t^*$ is unique in $\delta(t-t^*)=D(C^*, \tilde{h}_{1/2}(t))$).

Observations: For timing applications, $C_i^*$ can be any unique point in $\tilde{h}_i(t)$. If the application is localization (measuring the antenna-to-antenna distance between A and B), one may need to estimate the minimum wireless propagation delay; in this case $t_i^*=\min(\mathrm{supp}(\tilde{h}_i(t)))$. And the response of the non-wireless signal paths may be calibrated. As just explained, the minimum requirements may be different for different applications.

Therefore, when two-way-timing happens for timing purpose only, propagation delays may mean: the propagation delays from timer A to timer B in the abstract model.

Weighted Consensus Combining

This is a method to improve the consensus averaging of neighbor time offsets, during blink cycles. The weights $W_K$ in D.4 may be calculated using MRC principle using the ClkQ, TOA estimation error, and clock error variances, may be used as inputs. However, no node may correctly estimate its own ClkQ (it may needs a reference to compare). Two approaches are proposed to estimate ClkQ.

1. Nodes calculate the rmse of their timing corrections during many blink cycles and use this as their ClkQ. In this case the combiner weights $w_k$ may improve adaptively, as ClkQ values will change $w_k$'s and vice versa.

2. Using theoretical analysis, with the knowledge of node density, and TOA estimation error and clock error variances to theoretically estimate a tier's average ClKQ and assign this average ClkQ for all nodes in that tier, to determine $w_k$.

Timing Agreement Among Multiple Masters

Whenever the TVN has more than one master node for timing reference, all master nodes may agree to a common reference time within acceptable accuracy. Although master nodes can have precise clocks, if left uncorrected for long periods of times, their timers may drift apart. One possible solution for timing among the masters is described below.

Solution: Form a 2nd TVN (Master-TVN) among the master nodes, now this Master-TVN may use the same networking and fast re-timing techniques among themselves, designating one of them as their master. A master-TVN has to rely on signals that can propagate to longer distances than the slave node's ROC. Also due to their highly stable and accurate clocks, they may not need to repeat the blink cycles as often as the slave TVN does. For example master-TVN could repeat blinking every hour or every few minutes as opposed to slave TVN blinking in the order of 100 µs to 1 ms time intervals.

Simulation and Numerical Results

A first set of simulation results are now presented. They were obtained through system level simulations that closely simulate the operation of each node in the network. The timing algorithm described above was implemented in a network simulator using object oriented design in Matlab and C++ to perform close-to-system level simulations. The simulator places $N_M$ masters and $N_S$ slaves on a two-dimensional (2D) surface according to some spatial distribution model (Poisson, uniform, etc.), runs algorithms A-C to form a TVN, and runs algorithm D to do continuous re-timing. The physical layer (radio interface and the channel) is abstracted, such that only time of arrival estimation error ($\sigma_{TOA}$), clock jitter ($\sigma_J$) and receive SNR levels ($\gamma_{ij}$, $\gamma_{TH}$) are used to characterize the physical layer. Hence, it is assumed that the multipath diversity due to UWB signaling is also absorbed into $\sigma_{TOA}$.

Figure 13:
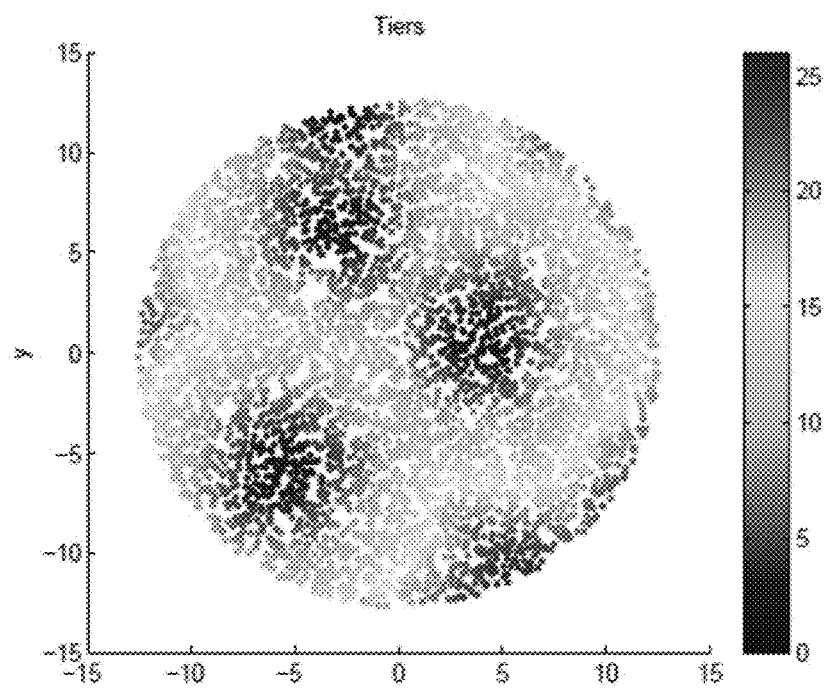
FIG. 13 illustrates an example of tiers of a TVN.
Figure 14:
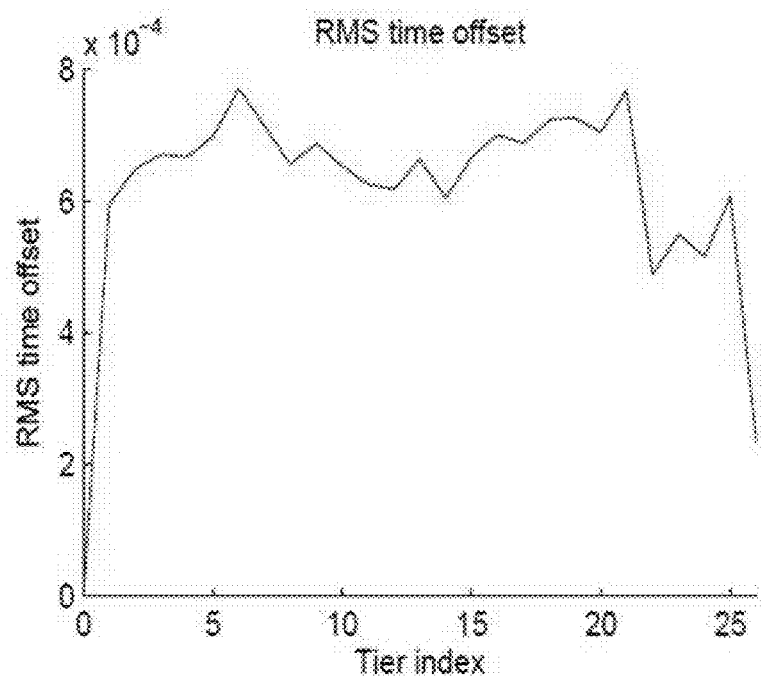
FIG. 14 illustrates an example of variation of RMS time offsets along the tiers in μs.
Figure 15:
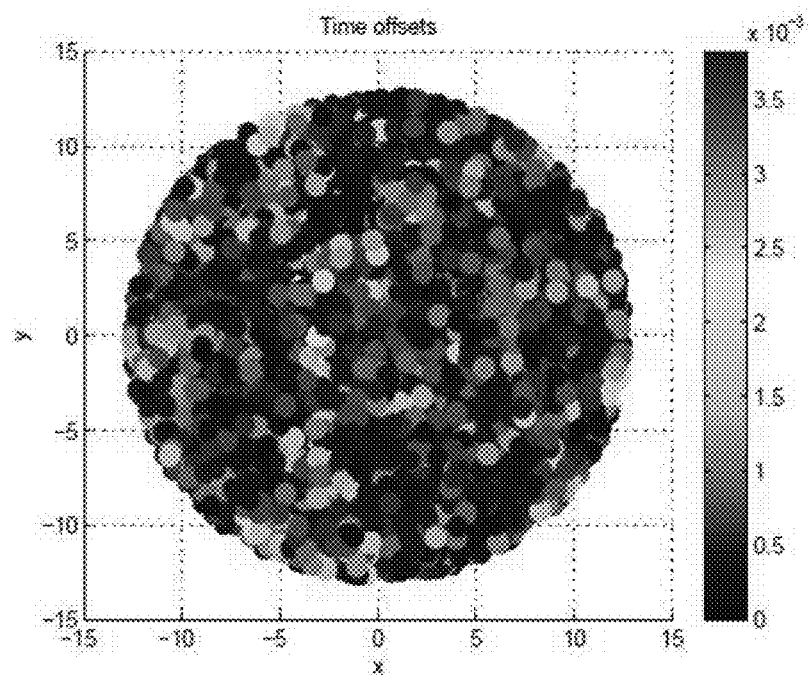
FIG. 15 illustrates an example of an instantaneous snapshot of timing errors.

No units for linear dimensions and time are necessary for the simulations, since the results are scalable. However, to give a practical insight, following parameter settings are done. Simulation results shown in FIGS. 13-15 are for $N_M$=5 and $N_S$=5000, a 2D Poission spatial spread model was assumed with an average node density, λ=0.0013 m$^{-2}$. Neglecting fading effects, each transmitter is assumed to have a radius of coverage (within which the SNR exceeds $\gamma_{TH}$) of 50 m that results in an average of 10 neighbors per node. With 5000 slaves the network's radius of coverage is approximately 1.118 km. The following values were assumed, $\sigma_{TOA}$=1 ns, $\sigma_J$=7.74×10$^{-9}$ s/√s (assuming a Wiener process model), and $2\tau_B$=60 µs. Relative slave clock frequencies are assumed to always have some error and modeled by a normal random variable with mean 1 and a standard deviation 10$^{-6}$.

FIG. 13 illustrates an example of tiers of the TVN with $N_m$=5 and $N_s$=5000 with 10 neighbors per node has 26 tiers (colored figure). This network, with a number of 5000 nodes with 5 masters, and the above defined parameters has 26 tiers in this realization. It is observed that the blink algorithm converges and may give nearly the same steady state performance regardless of the number of tiers in the TVN. However, the time to reach the steady state may increase with number of tiers, i.e., nodes in the outer most tiers may have to wait longer to achieve timing, where tier 1 may achieve it in few cycles of the blink protocol.

FIG. 14 illustrates an example of variation of RMS time offsets along the tiers in µs. FIG. 14 shows the variation of the root-mean-square-error (rmse) of the timing offsets in each tier, calculated as $rmse_i = \sqrt{\Sigma_{n \in T_i} \epsilon_n^2}$, where $\epsilon_n$ is the timing offset of the node n w.r.t the master time axis. In the middle tiers, $rmse_i \approx 0.65$ ns which is lowered from $\sqrt{\sigma_{TOA}^2 + \sigma_J^2 \cdot 2\tau_B}$ due to the diversity in the neighbor hood. However, full diversity from all the neighbors ($\approx$10) may not be available, since the diversity from the neighbors in the node's own tier may not be useful. The value of $rmse_i$ is lower than those in the middle tiers, since the 1$^{st}$ tier is directly connected to the masters. The $rmse_i$ at the outer most tiers should be higher than the middle tiers, since those tiers have less diversity available. However, this effect is not observed in the plots. The outer most tiers only have a small number of nodes and hence make it difficult to calculate a reliable statistical ensemble average.

FIG. 15 illustrates an example of the instantaneous snapshot of timing errors. In FIG. 15, a snapshot of the timing errors of the nodes during the steady state is shown.

Figure 16:
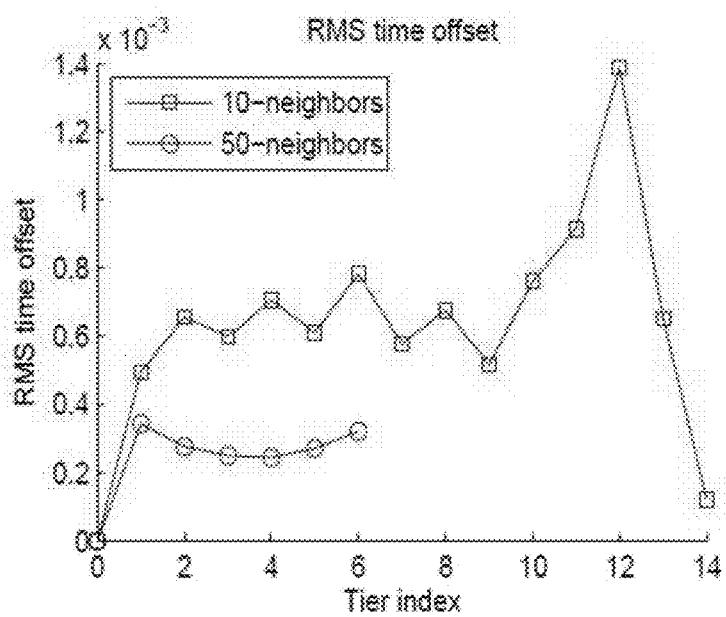
FIG. 16 illustrates an example of variation of RMS time offsets along tiers in µs for $N_S=1000$ with 10 and 50 average neighbors per node.

FIG. 16 illustrates an example of variation of RMS time offsets along the tiers in µs, for Ns=1000 with 10 and 50 average neighbors per node. A comparison of tier wise rmse timing offsets for average number of neighbors 10 and 50 is shown in FIG. 16 with Ns=1000 (all other parameters remain unchanged). The improvement in timing performance with node density is demonstrated.

The initialization algorithm was able to create the TVN regardless of the size of the network. It also provides initial timing for almost all nodes connected to the TVN with no dependency on the size of the network.

Figure 17:
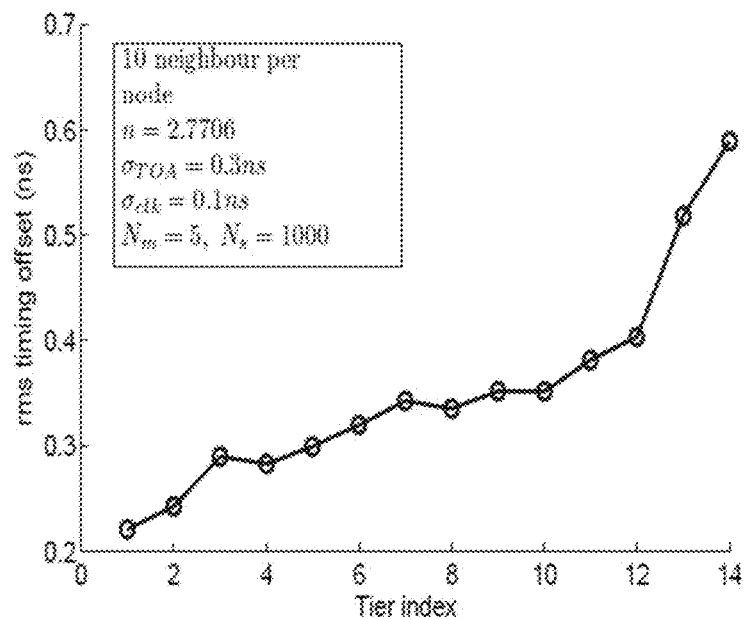
FIG. 17 illustrates an example of performance in more practicable settings where $N_m=5$ and $N_s=1000$ with 10 average neighbors per node.

FIG. 17 illustrates an example of performance in more practicable settings $N_m$=5 and $N_s$=1000 with 10 average neighbors per node. Each node has 30 m radius of coverage, 0.3 ns TOA estimation accuracy at 30 m distance, 0.1 ns of accumulated clock errors within one blink cycle time, channel's power decay exponent 2.77.

Figure 18:
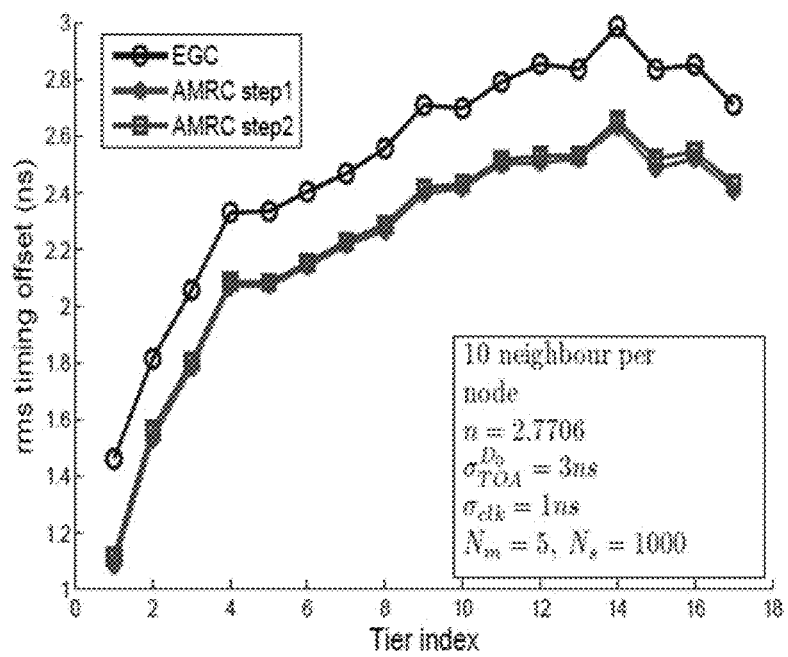
FIG. 18 illustrates an example of performance of simple averaging (i.e., $w_i$ are equal) and adaptive weight adjustment based on MRC principle.

FIG. 18 illustrates and example of performance of simple averaging (i.e., $w_i$ are equal) and adaptive weight adjustment based on MRC principle. Different set of practicable settings: $N_m$=5, $N_s$=1000 with 10 average neighbors per node. Each node has 30 m radius of coverage, 3 ns TOA estimation accuracy at 30 m distance, 1 ns of accumulated clock errors within one blink cycle time, channel's power decay exponent 2.77

CONCLUSION

A network timing algorithm for large wireless networks has now been presented. The proposed algorithm may create a timing virtual network from a set of randomly deployed nodes. The algorithm may learn the neighbors, their link propagation delays, channel signatures, position flags, and clock qualities. Using this information, the algorithm may perform a physical layer fast pulse broadcasting to achieve fast and accurate re-timing. Timing may be achieved through averaging-based consensus.

Simulation results show the algorithm may provide accuracy even with large number of nodes in the network, and thus may provide outstanding scalability. Given the possible accuracy of TOA determination in UWB networks, nanosecond accuracy timing in networks with thousands of nodes may become feasible.

Unless otherwise indicated, the various nodes that have been discussed herein are implemented with a computer system configured to perform the functions that have been described herein for the component. Each computer system includes one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include software (e.g., one or more operating systems, device drivers, application programs, and/or communication programs). When software is included, the software includes programming instructions and may include associated data and libraries. When included, the programming instructions are configured to implement one or more algorithms that have been described herein and/or one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

Figure 19:
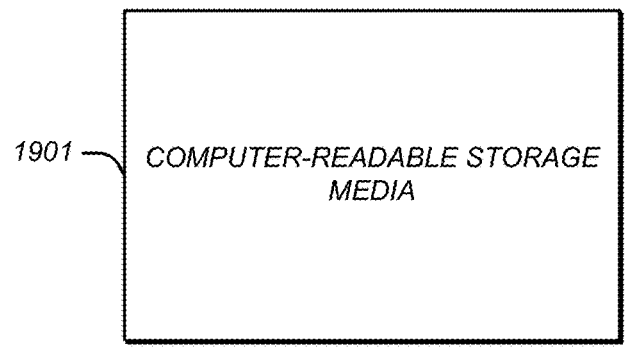
FIG. 19 illustrates an example of computer-readable storage media.

FIG. 19 illustrates an example of computer-readable storage media 1901. The media may be non-transitory and tangible and may contain a program of instructions that constitute all or portions of the software that has been described herein and that cause a node running the program of instructions to provide any combination of the functions described herein.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the system may work with just one master, the network may consist of only a few slave nodes, they may be a different implementation of the physical layer signals, and a radio interface is possible. A system can also avoid self initialization in phase I and rely on manual initialization, depending on the particular application. The timing among masters could be implemented in different ways.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. Non-transitory, tangible, computer-readable storage media containing a program of instructions that cause a single wireless slave node running the program of instructions in a timing virtual network (TVN) with neighboring wireless slave nodes to:
   store information indicative of an identity, link propagation delay, and wireless channel impulse response of each of its neighboring wireless slave nodes;
   repeatedly perform a physical layer fast reference signal broadcast transmission and reception; and repeatedly update a timing estimate based on the results of the repeated broadcast transmission and reception and the stored information.

2. The storage media of claim 1 wherein the program of instructions causes the single slave node running the program of instructions to store information indicative of a clock quality of each of its neighboring wireless slave nodes.

3. The storage media of claim 1 wherein the program of instructions causes the single wireless slave node running the program of instructions to store information indicative of a position flag of each of its neighboring wireless slave nodes.

4. The storage media of claim 1 wherein the program of instructions causes the single wireless slave node running the program of instructions to determine the link propagation delay of each of its neighboring wireless slave nodes.

5. The storage media of claim 1 wherein the program of instructions causes the single wireless slave node running the program of instructions to determine the channel signature of each of its neighboring wireless slave nodes.

6. The storage media of claim 1 wherein the program of instructions causes the single wireless slave node running the program of instructions to generate multiple timing offset estimations and to combine the multiple timing offset estimations using a weighted averaging.

7. The storage media of claim 6 wherein the weighted averaging uses weights and the combining adaptively adjusts the weights based on the stored information.

8. The storage media of claim 1 wherein the program of instructions causes the single wireless slave node running the program of instructions to improve the accuracy of the timing estimate by using both hardware acceleration and software digital signal processing (DSP) based on a timing correction calculation.

9. The storage media of claim 1 wherein the program of instructions causes the single slave node running the program of instructions to store information indicative of a clock quality of the single wireless slave node.

10. A timing virtual network (TVN) comprising:
multiple single wireless slave nodes, each single wireless slave node comprising storage media containing a program of instructions of the type recited in claim 1; and
one or more master nodes, each having a configuration that delivers reference timing signals to its neighboring wireless slave nodes without receiving or using timing information from any other wireless slave node in the TVN,
wherein the slave nodes are in two groups and wherein a first of the groups transmits simultaneously while a second of the groups simultaneously receives the transmission from the first group and wherein, subsequently, the second of the groups transmits simultaneously while the first of the groups simultaneously receives the transmission from the second group.

11. The TVN of claim 10 wherein at least one of the wireless slave nodes does not obtain timing information directly from any master node.

12. The TVN of claim 10 wherein the master and wireless slave nodes cooperate to provide distributed collision avoidance, distributed collision reporting, and distributed broadcasting.

13. The TVN claim 10 wherein the program of instructions in at least one wireless slave node causes the wireless slave node to store information indicative of a clock quality of each of its neighboring wireless slave nodes.

14. The TVN of claim 10 wherein the program of instructions in at least one wireless slave node causes the wireless slave node to store information indicative of a position flag of each of its neighboring wireless slave nodes.

15. The TVN of claim 10 wherein the program of instructions in at least one wireless slave node causes the wireless slave node to determine the link propagation delay of each of its neighboring wireless slave nodes.

16. The TVN of claim 10 wherein the program of instructions in at least one wireless slave node causes the wireless slave node to determine the channel signature of each of its neighboring wireless slave nodes.

17. Multiple timing virtual networks (TVNs), each of the type recited in claim 10, each TVN containing multiple master nodes, each of the type recited in claim 10, each master node having neighboring master nodes and a configuration that:
stores information indicative of a clock quality of the master node;
stores information indicative of an identity, link propagation delay, and channel signature of each of its neighboring master nodes; and
repeatedly perform a physical layer fast reference signal broadcast transmission and reception; and
repeatedly update a timing estimate based on the results of the repeated broadcast transmission and reception and the stored information.

18. The multiple TVNs of claim 17 wherein at least one of the wireless slave nodes in each TVN does not obtain timing information directly from any master node.

19. The multiple TVNs of claim 17 wherein the master and wireless slave nodes in each TVN cooperate to provide distributed collision avoidance, distributed collision reporting, and distributed broadcasting.

20. The TVN of claim 10 wherein the nodes determine their neighbors, neighbor's channel impulse responses, and membership in the groups by obtaining information from their neighbors only.

* * * * *